United States Patent Office 3,637,739
Patented Jan. 25, 1972

3,637,739
TETRAHYDROTETRAAZAPORPHINE DYESTUFFS
Bernard Lamure, Lyon, France, assignor to
Societe Rhodiaceta, Paris, France
No Drawing. Filed Mar. 28, 1969, Ser. No. 811,584
Claims priority, application France, Mar. 29, 1968,
146,471
Int. Cl. C07d 27/76
U.S. Cl. 260—314                5 Claims

ABSTRACT OF THE DISCLOSURE

The invention provides novel tetrahydrotetraazaporphine dyestuffs containing carboxylic ester groups which can be used to colour polyamides and polyesters by incorporation in the polymer molecule.

---

The present invention relates to tetrahydrotetraazaporphine dyestuffs.

The present invention provides dyestuffs of the formula:

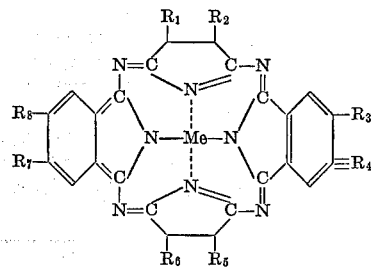

where Me represents a metal atom or two hydrogen atoms, $R_1$, $R_2$, $R_5$ and $R_6$ are the same or different and each represents a hydrogen atom, a halogen atom, a nitro group, a tertiary amino group, or a lower alkyl or lower alkoxy group, $R_1$ and $R_2$ and/or $R_5$ and $R_6$ being optionally joined to form a substituted or unsubstituted cycloaliphatic ring, and $R_3$, $R_4$, $R_7$ and $R_8$ are the same or different and each represents a hydrogen atom, a halogen atom, a nitro group, a tertiary amino group, a lower alkyl or lower alkoxy group, or a —COOR group (where R is a hydrogen atom or a hydrocarbon radical), at least one of $R_3$, $R_4$, $R_7$ and $R_8$ being a —COOR radical, R is preferably alkyl of 1 to 6 carbon atoms.

The tetrahydrotetraazaporphine nucleus of the dyestuffs of the invention may contain an atom of a monovalent or polyvalent metal, bonded in the form of a complex, such as for example sodium, potassium, lithium, calcium, zinc, tin; and especially copper, cobalt, iron, lead or nickel.

The acids from which the dyestuffs of the present invention are derived may be obtained by various known methods for the preparation of phthalocyanines in general, by at least partially replacing the orthophthalic acid or a derivative thereof, such as the anhydride, amide or nitrile, by, first, at least one of trimellitic and pyromellitic acids or a derivative thereof, and, secondly, a diacid which for greater clarity in the description which follows will be called the secondary diacid or a derivative thereof. Thus in general the new dyestuffs may be made by heating together acids of formulae:

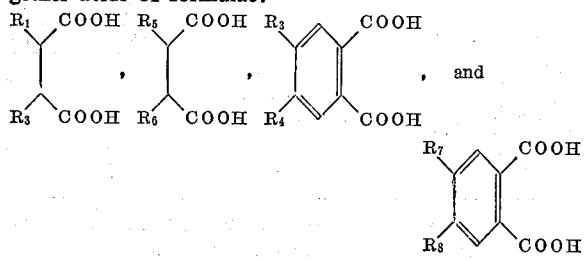

or derivatives thereof, with a source of nitrogen where the said derivatives are not amides or nitriles, and optionally a source of metal, a catalyst, and/or a diluent, and esterifying the product.

The secondary diacid of formula:

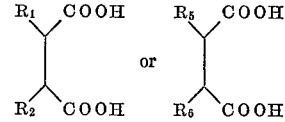

is a saturated aliphatic or cycloalkane diacid containing two carboxyl groups on neighbouring carbon atoms and optionally substituted, for example by lower alkyl or lower alkoxy or by tertiary amine, nitro and halogen groups. The preferred secondary diacids are succinic and hexahydrophthalic acids.

In the methods of carrying out the process of the invention, it is necessary to distinguish between those which produce free tetrahydrotetraazaporphines and those which produce metallised tetrahydrotetraazaporphines.

The free tetrahydrotetraazaporphines may be obtained directly by reaction of the orthodinitrile of trimellitic acid or pyromellitic acid, mixed with a dinitrile of the secondary diacid and optionally with ortho-phthalic nitric, with amines or phenols in an inert solvent and with heating. It is also possible to demetallize a sodium tetrahydrotetraazaporphine obtained by reaction of trimellitic or pyromellitic acid ortho-dinitrile, mixed with the dinitrile of a secondary diacid and optionally with orthophthalic nitrile, with the sodium derivative of a lower alcohol.

The metallized tetrahydrotetraazaporphines of the invention may be prepared by several methods. The first method consists of reacting the orthodinitrile of trimellitic or pyromellitic acid, mixed with the dinitrile of the secondary diacid and optionally with orthophthalic nitrile, with a metal or a metal salt and quinoline, in the presence of trichlorobenzene and with heating. In the second method, a mixture of trimellitic or pyromellitic acid, its anhydride or its orthodiamide with the secondary diacid, or its anhydride or diamide, and optionally with orthophthalic acid, its anhydride or amide is prepared. This mixture is heated with urea and a metal salt in the presence of a catalyst such as ammonium molybdate or boric acid, and in a diluent such as trichlorobenzene, chloronaphthalene or kerosene. The reaction of a metal with a mixture of the orthocyanoamide of trimellitic or pyromellitic acid, a derivative of the secondary diacid in which the group

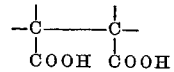

is replaced by the group

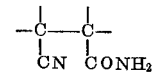

and optionally orthocyanobenzamide, at about 250° C. for 4 to 6 hours, constitutes a third method of preparation.

Furthermore, starting from a metallic tetrahydrotetraazaporphine, a different metallic tetrahydrotetraazaporphine may be prepared by replacing the metal of the first compound by a different metal which leads to the formation of a more stable complex.

Finally, it is possible to introduce a metal into a free tetra-hydrotetraazaporphine.

The tetrahydrotetraazaporphines containing carboxyl groups so obtained are subsequently esterified in known manner with alcohols or phenols, for example by heating to about 235° C. under pressure.

In addition a tetrahydrotetraazaporphine carrying ester groups according to the invention can be converted into a product with different ester groups by a transesterification reaction with a different alcohol or phenol.

The dyestuffs of the invention may be a variety of colours, especially greens, and they possess excellent fastness to light. They are insoluble in the usual organic solvents and melt at temperatures of 360° C. or above.

These dyestuffs can be used as pigments in colouring polymer compositions and preferably, in colouring polyamides and polyesters by inclusion in the polymer molecule or residues of a dyestuff of the invention formed by removal of —OR radicals from one or more of the —COOR groups. The coloured polyesters are obtained by polycondensation of at least one aliphatic or cycloalkane diol of 2 to 10 carbon atoms with at least one aliphatic or preferably aromatic diacid, particularly terephthalic acid, with at least one dyestuff of the present invention in a minor amount relative to the total of the constituents of the mixture, under conditions (temperature or catalysts) which are in themselves known. Equally, coloured copolyamides are obtained by polycondensing a dyestuff of the invention with a major proportion of a monomer which may be either a reaction product of an aliphatic or aromatic diacid, an aliphatic or aromatic diamine, or a lactam or an aminoacid.

The coloured polymers thus obtained can, either as such or mixed with similar but colourless polymers, be shaped, for example, into filaments or films. These polymers possess tints of a remarkable fastness, particularly to light, and are characterised by high transparency which is particularly valued in the case of films and which cannot be obtained with known tetraazaporphines.

The following Examples illustrate the invention, yields are expressed by weight.

EXAMPLE 1

10 g. (0.1 mol), of succinic anhydride, 19.2 g. (0.1 mol) of trimellitic anhydride, 120 g. (2 mols) of urea, 10 g. of anhydrous nickel chloride ($NiCl_2$), 4 g. of ammonium molybdate, and 220 g. of nitrobenzene are introduced into a 2 litre glass reactor provided with a turbine stirrer.

The mixture is heated with vigorous stirring for 4 hours at 135° C. The resulting product is treated with two litres of 5% aqueous hydrochloric acid, and the nitrobenzene is then removed by steam distillation. The mixture is filtered and the residue is washed with water until all the hydrochloric acid has been removed. The product is then treated with 500 ml. of boiling 2% aqueous sodium hydroxide. The resulting black solution is filtered and then acidified with hydrochloric acid. A precipitate is obtained which is washed with water until neutral and then dried at 100° C. for 24 hours. 9.7 g. (34.4% by weight yield) of a black powder, which is essentially nickel dicarboxydibenzotetrahydrotetraazaporphine, are obtained.

8 g. of this powder and 100 ml. of butanol are introduced into an autoclave provided with an anchor-shaped stirrer. The autoclave is purged with nitrogen and then the mixture is heated with stirring to a temperature of 230° C. This temperature is maintained for seven hours, the autogenous pressure being about 70 bars. After cooling, the diester is removed from the autoclave, the autoclave is rinsed with 200 ml. of butanol, and the residue is then washed with 200 ml. of the same solvent. The residue is dried at 100° C. for 24 hours, and 6.5 g. a (67.7% yield of a black powder, which is essentially nickel di(butoxycarbonyl)dibenzotetrahydrotetraazaporphine, are obtained. The infrared spectrum of this powder has a band at 5.90 microns which indicates the presence of carbonyl groups.

EXAMPLE 2

The procedure of the first experiment of Example 1 is followed, except that the succinic anhydride is replaced by hexahydrophthalic anhydride (15.4 g. 0.1 mol). When the solution obtained by dissolving the resulting product in one litre of 2% boiling sodium hydroxide solution is acidified, 10 g. (30.0% yield) of a blue powder, which is essentially nickel dicarboxydibenzodicyclohexanotetraazaporphine, are obtained.

10 g. of this powder are then completely esterified in 120 ml. of butanol in the same manner as described in Example 1. 9.5 g. (81.2% yield) of a bluish-violet powder, which is essentially nickel di(butoxycarbonyl)dibenzodicyclohexanotetraazaporphine are obtained.

EXAMPLE 3

250 g. of dimethyl tetraphthalate, 177.5 g. of ethylene glycol, 0.125 g. of manganese acetate $Mn(CH_3COO)_2$, 0.101 g. of antimony oxide $Sb_2O_3$, and 1.25 g. of a dyestuff with ester groups prepared as described in Example 1 or 2, are introduced into a 1 litre glass reactor which is suitable for use at a high vacuum and which is provided with a stirrer, a distillation column and a nitrogen inlet tube and which has an outlet orifice at the bottom. The reactor is heated using an oil bath. The polymerization is carried out under normal pressure in a nitrogen atmosphere for 3 hours at between 160° and 220° C.; when the theoretical amount of methanol has been distilled off, the temperature is gradually raised to 275° C. and the pressure is then gradually reduced to 0.2 to 0.3 mm. Hg; the temperature is then raised to 280° C. and the reaction mixture kept under these conditions for 50 minutes.

The resulting copolymer is a homogeneously coloured mass which is free from impurities and which can be very satisfactorily extruded in the molten state to form filaments or transparent films.

The properties of the copolymers for each dyestuff used are indicated in the table below, in which the term "S.V." represents the specific viscosity of the polymer as a 1% solution in orthochlorophenol at 25° C.

| Dyestuff | | Polymer | |
|---|---|---|---|
| | Colour | S.V. | Colour |
| Example No.: | | | |
| 1 | Black | 0.82 | Green. |
| 2 | Bluish-violet | 0.93 | Do. |

Each of the polymers obtained as described above is spun in the molten state at 285° C. and the resulting yarn is stretched on a mandrel at 85° C. and on a plate at 160° C.; a yarn of 65 deniers (72.2 dtex) guage/33 strands is obtained. The yarns, which have the same colours as the corresponding polymers, have a strength of 4.22 g./den. (38 g./tex.) and an elongation at break of 20.3%.

The colour fastness of the yarns are determined using a scale of indices ranging from 1 (very poor fastness) to 8 (exceptional fastness) in accordance with the ECE Code of Fastness, second edition 1958. The tests of the fastness of the colour to heat treatment are carried out in accordance with the recommendations of the ECE Code of Fastness, 1st supplement 1963, using an apparatus commercially available under the registered trade name "Thermotest." This ECE Code of Fastness (second edition 1958 and supplements) is edited by the "Association for the Study and Publication of Methods for the Determination of Fastness," 12, rue d'Anjou, Paris (8e). The colour fastness of the above yarns is excellent, as is shown by the following table:

| Treatment | Fastness of the colour | Discharge on comparison sample |
|---|---|---|
| None | 7 | |
| Desizing at the boil | 4-5 | 5 |
| Bleaching with sodium chlorite at 80° C | 5 | 5 |
| Cleaning with perchlorethylene at 60° C | 5 | 5 |
| "Thermotest" experiment at: | | |
| 150° C | 5 | 5 |
| 180° C | 5 | 5 |
| 210° C | 5 | 5 |

The shrinkages of a woven fabric, measured in boiling water, in steam at 130° C. and in hot air at 180 and 210°

C. are of the same order as the shrinkages observed on a reference sample of woven fabric of the same construction.

I claim:

1. A dyestuff of the formula:

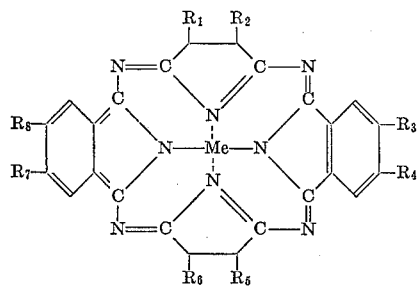

where Me represents a metal atom selected from the group consisting of sodium, potassium, lithium, calcium, zinc, tin, copper, cobalt, iron, lead and nickel or two hydrogen atoms, $R_1$, $R_2$, $R_5$ and $R_6$ are the same or different and each represents a hydrogen atom, a halogen atom, a nitro group, or a lower alkyl or lower alkoxy group, $R_1$ and $R_2$ and/or $R_5$ and $R_6$ being optionally joined to form a cyclohexane ring, and $R_3$, $R_4$, $R_7$ and $R_8$ are the same or different and each represents a hydrogen atom, a halogen atom, a nitro group, a lower alkyl or lower alkoxy group, or a —COOR group (where R is a hydrogen atom or alkyl of 1 to 6 carbon atoms), at least one of $R_3$, $R_4$, $R_7$ and $R_8$ being a —COOR radical.

2. A dyestuff according to claim 1, in which $R_1$, $R_2$, $R_5$ and $R_6$ are hydrogen, or $R_1$ and $R_2$ or $R_5$ and $R_6$ are joined to make up a cyclohexane ring.

3. A dyestuff according to claim 1, in which one or two of $R_3$ and $R_4$ and one or two of $R_7$ and $R_8$ are —COOR groups and any remainder are hydrogen atoms.

4. A dyestuff according to claim 1, which is nickel di(butoxycarbonyl)dibenzotetrahydrotetraazaporphine.

5. A dyestuff according to claim 1, which is nickel di(butoxycarbonyl)dibenzodicyclohexanotetraazaporphine.

References Cited

UNITED STATES PATENTS 2,681,344   1/1951   France _____ 260—314

HENRY R. JILES, Primary Examiner

H. I. MOATZ, Assistant Examiner

U.S. Cl. X.R.

8—178 R, 179; 260—868, 857 R